J. C. MARTINS.
FRICTION GEARING.
APPLICATION FILED AUG. 25, 1913.
1,130,527.
Patented Mar. 2, 1915.
2 SHEETS—SHEET 1.
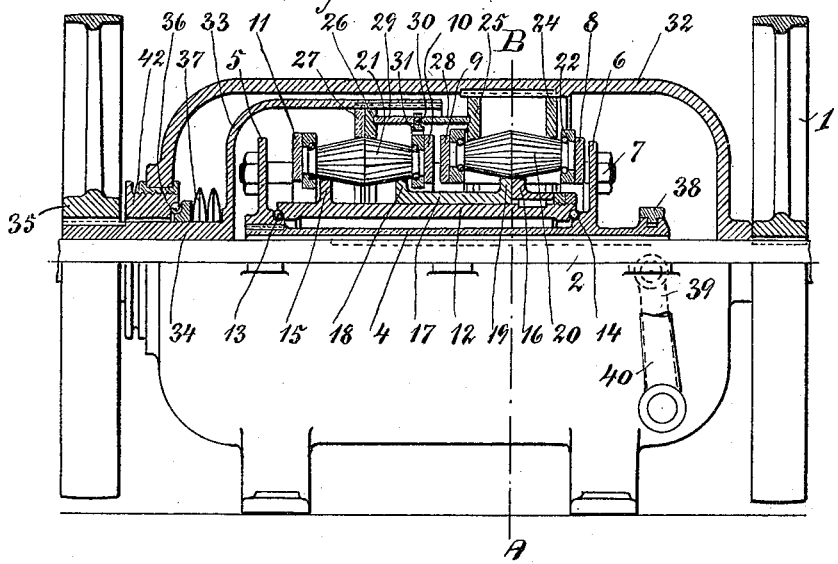
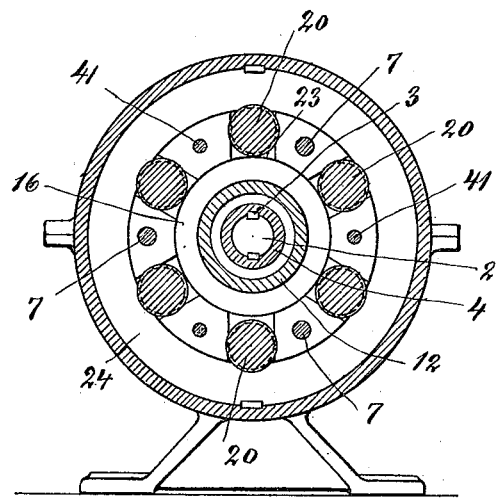
Witnesses
E. Daniels
C. H. Potter
Inventor
Jens Christian Martins
by Byrnes, Townsend & Brickenstein
Attys.

J. C. MARTINS.
FRICTION GEARING.
APPLICATION FILED AUG. 25, 1913.

1,130,527.

Patented Mar. 2, 1915.
2 SHEETS—SHEET 2.

Witnesses
E. Daniels
C. H. Potter

Inventor
Jens Christian Martins
by Byrnes Townsend & Brickenstein

UNITED STATES PATENT OFFICE.

JENS CHRISTIAN MARTINS, OF COPENHAGEN, DENMARK, ASSIGNOR TO TRANSMISSION AKTS., OF COPENHAGEN, DENMARK.

FRICTION-GEARING.

1,130,527.  Specification of Letters Patent.  Patented Mar. 2, 1915.

Application filed August 25, 1913. Serial No. 786,516.

*To all whom it may concern:*

Be it known that I, JENS CHRISTIAN MARTINS, a subject of the King of Denmark, residing at Amagerbrogade 102, Copenhagen, Denmark, have invented certain new and useful Improvements in Friction-Gearing, of which the following is a full, clear, and exact description.

Friction gearings consisting of two sets of double conical bodies acting as planet wheels, which on one side roll on the outer circumference of flanges or disks and on the other side on the inner edge of rings, against which flanges and rings they are pressed with a suitable pressure, are known. In such apparatus, alteration of gearing is obtained by all or some of the said parts being displaced in relation to each other in the longitudinal direction of the double conical bodies, so that these latter are caused to roll with various diameters on the said flanges and rings.

The present invention relates to apparatus of this kind and its object is to produce a gearing in which reversal and idle running can be effected only by displacement as named above and without employment of couplings of any kind. This is obtained according to the present invention by providing such an arrangement that the planet wheel carriers in such a gearing are connected mutually and with one of the shafts of the apparatus, and by one set of the outer rings being made stationary while the other set of the said outer rings are connected with the other shaft of the apparatus. By such arrangement of the parts a certain mutual position of the said rings and flanges exists, which will be described below, in which the driven shaft of the apparatus will become stationary, and when the parts are displaced in one direction from this position, the shafts of the apparatus will be turned in the same direction, while through displacement in the opposite direction from the named neutral position they will be turned in opposite directions. The gearing obtained is in both cases contingent on the amount of the displacement of the parts in question from the said neutral position.

One form of the invention is shown in the accompanying drawings, in which—

Figure 3:
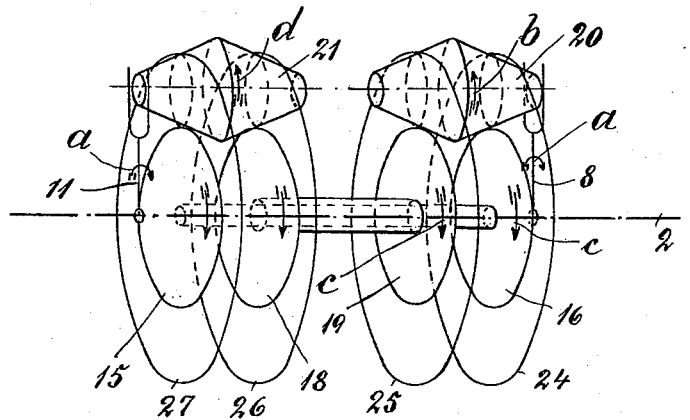
Figure 4:
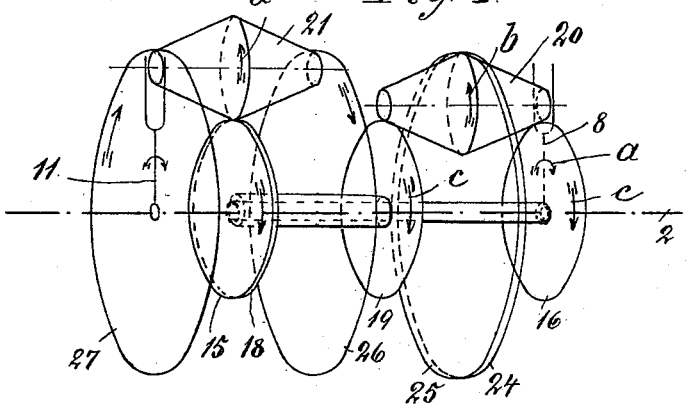
Figure 5:
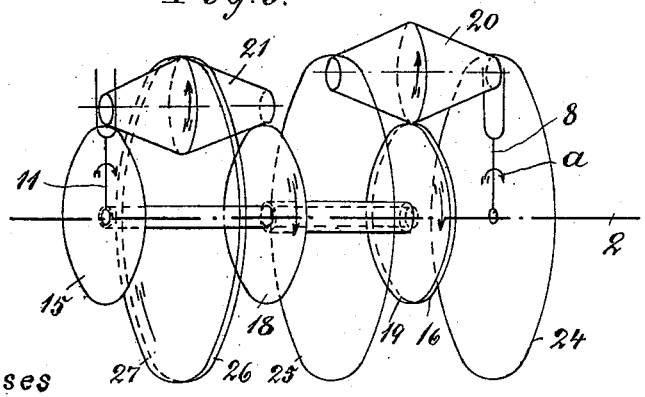

Figure 1 shows a partial longitudinal section, Fig. 2 shows a section on the line A—B, and Figs. 3–5 represent schematically various mutual positions which can be assumed by the parts of the apparatus.

The driving pulley 1 of the apparatus to which the power is led is keyed on the shaft 2, and this is by key and groove 3, Fig. 2, non-rotatably connected with a bushing 4 carrying the flanges 5 and 6, Fig. 1, which are also connected by bolts 7 serving for rotating the rings 8, 9, 10 and 11 forming the planet wheel carriers, while the rings are longitudinally displaceable on the bolts. The bolts 41, Fig. 2, keep the two sets of rings 8—9 and 10—12 forming the planet wheel carriers at the correct mutual distance. The tube shaped shaft 12, journaled in ball bearings 13 and 14, Fig. 1, carries the flanges 15 and 16, while the bushing 17 carries the flanges 18 and 19. The double conical bodies 20 and 21 are journaled in ball bearings 22 guided in slots 23, Fig. 2, in the rings 8, 9, 10 and 11 forming the planet wheel carriers. The outer rings 24, 25, are by key and groove connected with the stationary frame or casing 32 of the apparatus, while the rings 26 and 27 are in the same manner connected with a cylindrical bell 33 which is continued in a hollow shaft 34, to which the driven pulley 35 of the apparatus is keyed. Two cylindrical bodies 28 and 29 serve for keeping the rings 25 and 26 at a certain mutual distance and are separated from one another by a row of balls 30 arranged in a ball ring 31, and are centered by entering grooves turned in the rings 25 and 26 as shown in Fig. 1. The shaft 2 is journaled partly in the frame 32 and partly in the hollow shaft 34, which is in turn by the ball bearing 36 journaled in the said stationary frame. A spring washer 37 transmits the pressure from the ball bearing 36 to the said hollow shaft 34, from where the pressure is again transmitted to the rings, the flanges and the double conical bodies, so that these parts are caused to rest against each other with a pressure incurring a suitable friction. The tension of the spring can be adjusted by means of the bushing 42, which can be screwed forward and backward in the stationary casing 32. The bushing 4 is displaceable on the shaft 2 by means of a ring 38, which through a fork 39 is actuated from a lever 40.

Movement of the lever 40 to the right from the position illustrated in Fig. 1 will cause the bushing 4 and the tube shaped shaft 12 carrying the flanges 15 and 16 to be displaced to the right. The displacement of the flange 15 will force the double conical bodies 21 which are slidable radially in supports 8 and 11, outward in a radial direction, and this will wedge the rings 27 and 26 apart, thereby forcing the rings 26 and 25 to the right. This in turn will permit the double conical bodies 20 to be moved radially inward, toward the axis of the apparatus, whereupon they will to a certain extent enter between the flanges 16 and 19, thereby increasing the distance between the latter. It will be understood that the displacement of the flanges 15 and 16 will at the same time cause a longitudinal displacement in the same direction of the two planet wheel carriers and the double conical bodies, but only half as great as that of the flanges, the rings 27 and 24 not altering their position. On the other hand, the rings 26 and 25 will be displaced the same distance and in the same direction as the flanges 15 and 16. By these means the double conical bodies are caused to roll on the rings and flanges with different diameters, in order to effect alteration of the gearing as further explained hereinafter.

The apparatus acts in the following manner: The power is transmitted to the pulley 1 and from thence through the shaft 2, the bushing 4 and the flanges 5 and 6 to the planet wheel carriers 8—9 and 10—11. When the planet wheel carriers are rotated the double conical bodies 20 will roll in the stationary outer rings 24 and 25, and hereby the flanges 16 and 19 and thus also the flanges 15 and 18 will be rotated in the same direction as the planet wheel carrier. It will now be described, under reference to Figs. 3-5, how the double conical bodies 21, following the planet wheel carriers during the rotating of the same and rolling on the flanges 15 and 18 and in the rings 26 and 27, will be able to turn these rings in one or the other direction of revolution or eventually cause the same to stand still, dependent on the position of rings and flanges in relation to the double conical bodies. In the schematic Figs. 3-5 is for sake of clearness shown but one single of the double conical bodies of each set, while rings, flanges and planet wheel carriers are only indicated by lines, which are designated by the same reference numbers as the organs in Figs. 1 and 2 which they are meant to represent. The directions of revolution of the various organs are indicated through arrows.

If by means of the lever 40 the bushing 4 is displaced and therewith the hollow shaft 12 with the flanges 15 and 16 to such a position that the flanges and the outer rings are caused to roll on the same diameter of the double conical bodies, which takes place synchronously for both systems, the parts will assume the position shown schematically in Fig. 3. If the planet wheel carriers 8 and 11, which as described are both firmly connected with the shaft 2, be turned in the direction indicated by the arrows, the double conical body 20 will roll in the stationary rings 24 and 25, which force the bodies 20 to rotate on their own axes in the direction indicated by the arrows $b$, besides following the rotation of the planet wheel carrier; the flanges 19 and 16 will thereby be rotated in the direction indicated by the arrows $c$ at a speed which is dependent partly on the speed of rotation of the planet wheel carrier and partly on the speed at which the double conical bodies rotate on their axes. The flanges 15 and 18 which are non-rotatably connected with the flanges 16 and 19 rotate in the same manner and will cause the double conical bodies 21 to rotate on their axes in the direction of the arrow $d$ at a speed which is partly contingent on the speeds of the flanges 15 and 18 and partly on the speed of the planet wheel carrier 11. As the planet wheel carriers 8 and 11, as above named, are mechanically connected and are thus rotated at the same speed, the speed received by the rings 26 and 27 will be 0, as the rings 24 and 25 are stationary and the two systems are symmetrical. The pulley 35 connected with the rings 26 and 27 will thus stand still, and the described position of the parts corresponds to idle running.

If the parts are displaced by means of the lever 40, so as to assume the position shown in Fig. 4, both of the pulleys 1 and 35 are turned in the same direction. As will be seen, the double conical bodies 20 here roll with their smallest diameter on the flanges 16 and 19 and with their largest diameter in the rings 24 and 25, while the double conical bodies 21 on the contrary roll with their largest diameter on the circumference of the flanges 15 and 18 and with their smallest diameter in the rings 26 and 27.

If the planet wheel carrier is turned in the same direction and at the same speed as in the previous case, the double conical bodies 20 will by rolling in the stationary rings 24 and 25 be caused to rotate on their own axes at a smaller speed than in the above described case, as they now roll on a larger diameter in the said rings. The speed transmitted by the bodies to the flanges 16 and 19 will therefore be smaller than in the above named case, partly owing to the smaller speed of rotation and partly owing to the double conical bodies 20 rolling with a smaller diameter on the flanges 16 and 19. The flanges 15 and 18 will therefore impart the bodies 21 with a smaller speed of rotation on their axes than in the above named case, partly owing to the smaller speed of the flanges and partly owing to their rolling on the greatest diameter of the double conical bodies 21. These latter roll with their smallest diameter in the rings 26 and 27, and as the planet wheel carrier is rotated at the same speed as in the above case, the rings 26 and 27 will be carried along with them, as owing to the slow rotation of the rolls they are carried but insignificantly backward by the same.

If the parts by means of the lever 40 are displaced to the position indicated in Fig. 5, the double conical bodies 20 will, when the planet wheel carrier is continuously rotated at the same speed and in the same direction as hitherto, by rolling with the smallest diameter in the stationary rings 24 and 25 rotate at the greatest possible speed on their axes. As they roll on their largest diameter on the circumference of the flanges 16 and 19, these and thus also the flanges 15 and 18 will consequently rotate at the greatest possible speed. As the double conical bodies 21 rest against the circumference of the flanges 15 and 18 with their smallest diameters, they will be brought to rotate on their axes at the greatest possible speed, and as they roll in the rings 26 and 27 with their largest diameter, they will impart these latter with a speed in backward direction which is greater than that at which the planet carrier is turned forward. The result will thus be that the rings 26 and 27 and with these the pulley 35 will be rotated in a direction opposite to that in which the pulley 1 is rotated.

Figs. 4 and 5 show the extreme positions which can be assumed by the parts of the apparatus by displacement to one or the other side in relation to the neutral middle position shown in Fig. 3. It is obvious that intermediate positions will correspond to intermediate values of the ratio of gearing in one and the other direction of rotation.

An apparatus such as the one described can advantageously be used on almost all such occasions where it is desired to transmit the power from an engine to a working machine at different speeds, and where idle running and reversal is desirable. The apparatus can also be used in automobiles, motorlaunches, etcetera.

Having now particularly described and ascertained the nature of the said invention what I claim and desire to secure by Letters Patent is:

1. A friction gearing comprising a shaft, a planet wheel carrier slidably keyed thereon, two sets of double conical bodies acting as planet wheels, two connected sets of mutually non-rotatable but revoluble flanges adapted to be in frictional contact with said double conical bodies, a pair of non-rotatable and non-revoluble outer rings adapted to coact with one set of said double conical bodies, a driven shaft, and a set of outer rings connected therewith and adapted to frictionally engage the other set of said double conical bodies.

2. A friction gearing comprising a shaft, a planet wheel carrier slidably keyed thereon, two sets of double conical bodies acting as planet wheels, two connected sets of mutually non-rotatable but revoluble flanges adapted to be in frictional contact with said double conical bodies, a pair of non-rotatable outer rings, non-revolubly but relatively movable axially, adapted to coact with one set of said double conical bodies, a driven shaft, and a set of outer rings connected therewith but relatively movable axially, and adapted to frictionally engage the other set of said double conical bodies, the two axially movable rings having connections to cause them to move together.

3. A friction gearing comprising a shaft, a planet wheel carrier slidably keyed thereon, two sets of double conical bodies acting as planet wheels, said double conical bodies being movable radially and axially on said carriers, two connected sets of mutually non-rotatable but revoluble flanges adapted to be in frictional contact with said double conical bodies, a pair of non-rotatable outer rings, non-revoluble but relatively movable axially, adapted to coact with one set of said double conical bodies, a driven shaft, and a set of outer rings connected therewith but relatively movable axially, and adapted to frictionally engage the other set of said double conical bodies, the two axially movable rings having connections to cause them to move together.

In testimony whereof I affixed my signature in presence of two witnesses.

JENS CHRISTIAN MARTINS.

Witnesses:
 E. FREDERIKSEN,
 VIGGO BLOM.